United States Patent [19]
Fasino

[11] Patent Number: 5,701,841
[45] Date of Patent: Dec. 30, 1997

[54] BIRD FEEDER

[76] Inventor: Victor Fasino, 62 Oneida Ave., Landing, N.J. 07850

[21] Appl. No.: 598,683

[22] Filed: Feb. 8, 1996

[51] Int. Cl.$^6$ ............................................. A01K 39/00
[52] U.S. Cl. ............................... 119/52.2; 119/57.8
[58] Field of Search .................... 119/52.2, 52.3, 119/57.8, 57.9

[56] References Cited

U.S. PATENT DOCUMENTS

| | | | |
|---|---|---|---|
| 3,115,865 | 12/1963 | Parkes et al. | 119/52.2 |
| 3,244,150 | 4/1966 | Blair | 119/52.3 |
| 5,465,683 | 11/1995 | Reisdorf | 119/52.2 |

*Primary Examiner*—John G. Weiss
*Assistant Examiner*—Dennis Ruhl
*Attorney, Agent, or Firm*—Bernard J. Murphy

[57] ABSTRACT

A cylindrical-body bird feeder has an open bottom with a pair of cut-outs on opposite sides of the bottom. Slits, extending from the cut-outs latchingly receive a flexible floor for the body. The floor is only latchingly secured in the bottom, to facilitate cleaning of the feeder. In one embodiment of the feeder, the floor is latchable in either one of two pairs of slits, to accommodate the feeding of small seeds, or the feeding of large seeds, via window apertures, or via open troughs below the windows.

11 Claims, 3 Drawing Sheets

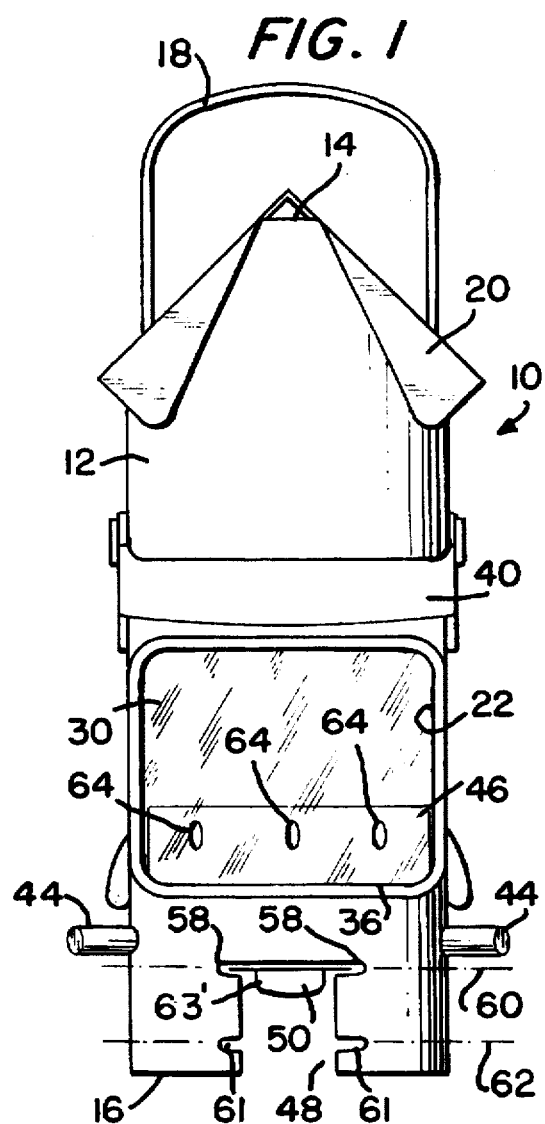
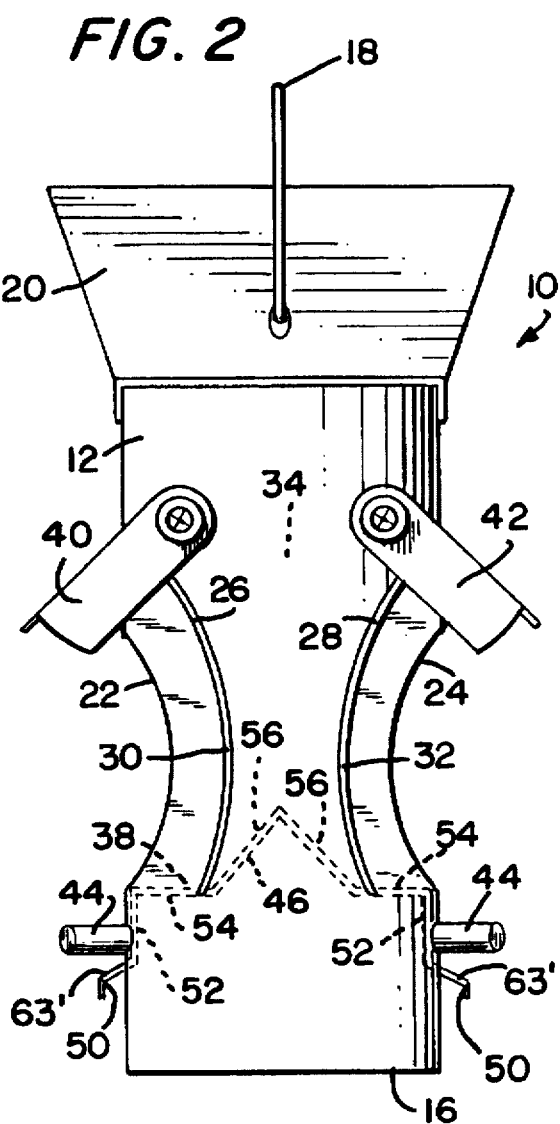
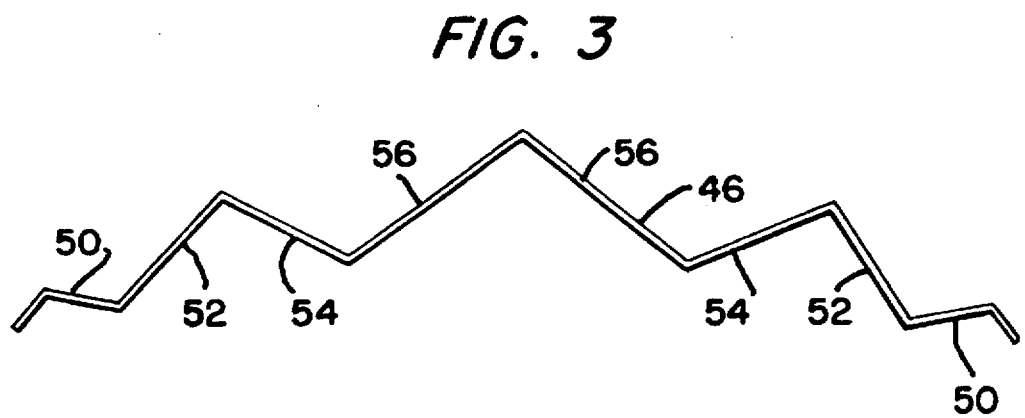

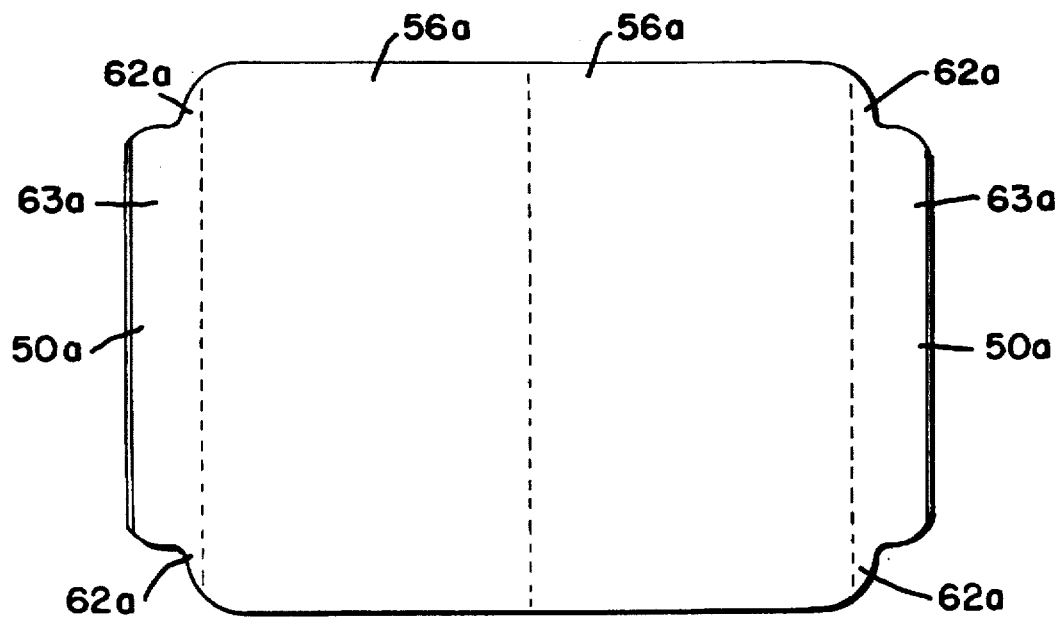
FIG. 7
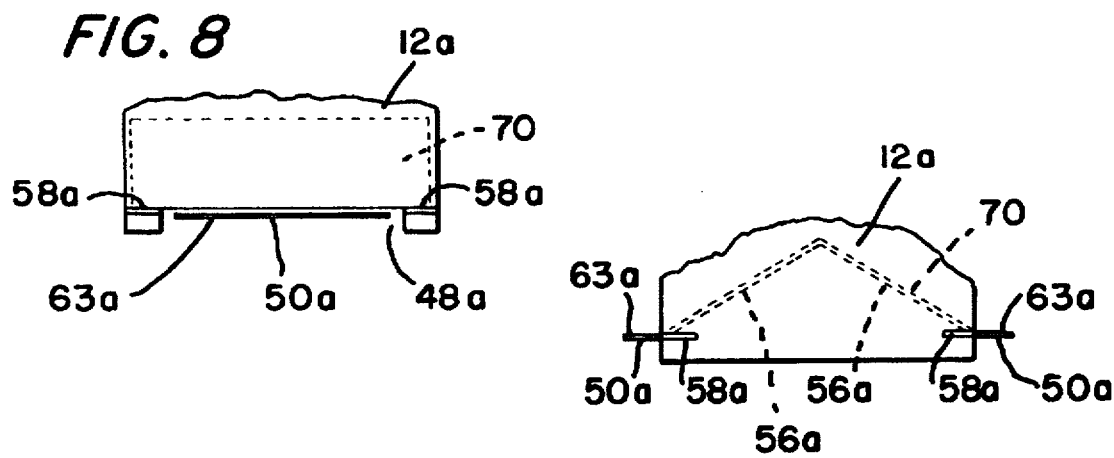
FIG. 8
FIG. 9
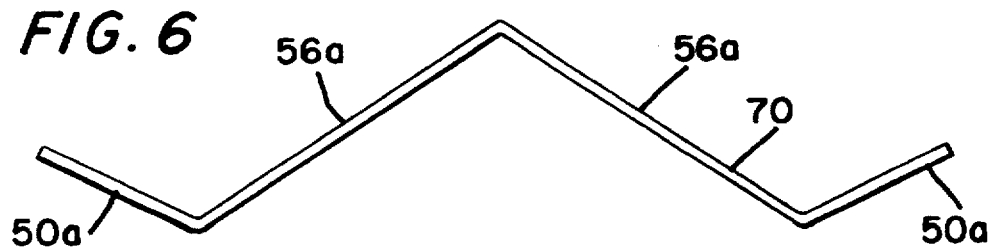
FIG. 6

BIRD FEEDER

This invention pertains to bird feeders, especially to the type of feeders which comprise walled feed chambers formed within elongate bodies, and in particular to a novel bird feeder of the aforesaid type which accommodates diverse feed and feeding modes, and can be cleansed with an especial facility.

In the prior art, bird feeders commonly are configured to offer either sunflower and mixed seed combinations, or to dispense smaller thistle seed and seed blends. In the former, the feeding access must be large enough to allow birds to take the coarser feed, and in the latter, the access must be small enough to prevent unwarranted spillage of the smaller seed while, nonetheless, giving birds means for taking the smaller seed. In addition, and particularly common, the prior art bird feeders are very difficult to clean periodically of soured or moldy seed, and detritus. They are open at the top to provide for charging the same with feed, but of course have fixed bottoms. To clean them, one must reach into the feed portals, if possible, or reach down into them from the open top or disassemble with an assortment of tools.

There has been a long unmet need for a bird feeder which can function in two modes of operation, namely, to dispense the smaller seed, and to dispense the larger seed, as well as a feeder which offers a ready means for clean out thereof without the need for tools.

It is an object of this invention, then, to set forth just such a needed, and novel bird feeder. Particularly, it is an object of this invention to disclose a bird feeder comprising a body; wherein said body has wall means therein cooperative with said body for forming a feed-charging chamber within said body; and floor means for forming a bottom of said feed chamber; wherein said floor means is only latchingly engaged with said body, and unlatchingly removable from said body by hand without the need for tools.

Further objects of this invention, as well as the novel features thereof, will become apparent by reference to the following description taken in conjunction with the accompanying figures, in which:

FIG. 1 is a front, elevational view of the novel bird feeder, according to an embodiment thereof;

FIG. 2 is a side, elevational view thereof;

FIG. 3 is a side view of the flexible floor, the same shown in its relaxed state;

FIG. 6 is a side view of an alternate embodiment of the flexible floor, the same also being shown in its relaxed state;

FIG. 7 is a plan view of the FIG. 6 floor, also in its relaxed state;

FIG. 8 is a front, elevational view of only a bottom portion of an alternate embodiment of the feeder, the same employing the FIGS. 6 and 7 floor therein; and FIG. 9 is a side elevational view of the aforesaid bottom portion again.

FIGS. 1, 2, 8 and 9 are shown in one scale, whereas FIGS. 3, 4, 5, 6 and 7 are shown in double the scale of FIGS. 1, 2, 8 and 9.

Figure 4:
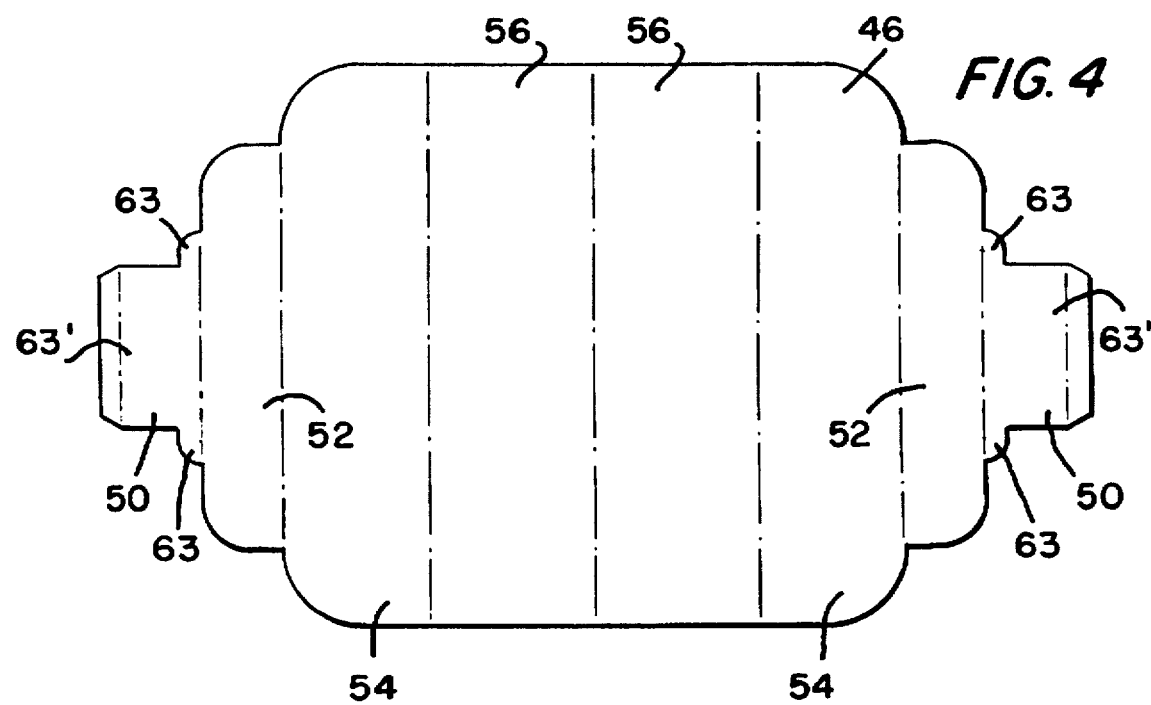
FIG. 4 is a plan view of the floor, again in its relaxed state.

As shown in FIGS. 1 and 2, the novel bird feeder 10, comprises a body 12 of hollow configuration, and open at the top 14 and bottom 16. A bail 18 is pivotely coupled to an upper portion of the body (not shown) and penetrates a covering roof 20. The roof 20 is slidable relative to the bail 18 to expose the open top 14 so that feed can be poured into the body 12. On opposite sides of the body 12 are openings 22 and 24, and also on opposite sides of the body 12 are paired arcuate slits 26 and 28. Transparent plastic walls 30 and 32, serving as well as windows, are fitted into the slits 26 and 28, to cooperate with the inner surfaces of the body 12 to form a feed chamber 34 within the body 12. The walls 30 and 32 are recessed or set back, in general parallelism with the openings 22 and 24. Each wall 30 and 32 has a lowermost termination 36 which cooperates with the lowermost portion of its respective opening 22 or 24 for forming a void 38 through which to provide external access into the body 12 and the feed chamber 34. Ancillary roofs 40 and 42 are fastened to the body 12 to overhang the openings 22 and 24 to shield the latter from precipitation. Too, short rods 44, four in number and spaced apart ninety degrees of arc about the body 12, project from the body to offer perches for the feeding birds. As priorly noted, the bottom 16 of the body 12 is open. Consequently, the invention provides a novel floor 46 for latching engagement with, and unlatching removal, from the body. Floor 46 is visible, in FIG. 1, through the windowed wall 30, and is shown in FIG. 2 in dashed outline. Floor 46 is formed of spring steel, i.e., stainless steel, and is held in the body by the referenced latching arrangement and due to its outwardly-biased disposition. Below the windowed walls 30 and 32 and the openings 22 and 24 are formed cut-outs 48 (only one thereof being shown). The same are formed on opposite sides of the body 12 at the base thereof where the open bottom 16 is located. FIGS. 3 and 4 show the floor 46 (in twice the scale of FIG. 1 and 2), in side and plan views, respectively, in its relaxed state. Floor 46 has tabs 50 at opposite ends thereof, flat, land panels 52 and 54 at each end, adjacent to the tabs 50, and flat, ramp panels 56 in the middle thereof. The body 12 has first slots 58, which commence at the cut-outs 48, and extend horizontally in a given plane 60, it being understood that these slots are formed outwardly from the cut-outs at both sides of the body 12 (although only those on one side are shown). Too, the body has further slots 61, corresponding to slots 58, also in opposite sides of the body 12, however slots 61 are horizontal in a differing plane 62. These slots 58 and 61 are what latchingly engage the floor 46 and secure it in place.

To latch the floor 46 in place, in the body 12, one contracts the floor 46 by squeezing the tab ends thereof, and inserting the contracted floor 46 into the bottom 16 of the body 12. Contracted floor 46 is inserted, for example, until the tabs 50 are aligned with the slots 58. The tabs 50 have first portions 63 which enter the slots 58, while second portions 63' of tabs 50 project outwardly from the cut-outs 48. Inserted, and contracted, the floor panels 52 confront and parallel the inside of the body 12, being set firmly thereagainst due to the spring biasing of the floor 46. The floor panels 54 assume a horizontal disposition, in the body 12, and close upon the lowermost terminations 36 of the widowed walls 30 and 32. Accordingly, the walls 30 and 32, in cooperation with the floor panels 54, close off the void 38 from access. With the floor 46 so positioned, it defines a first mode of operation of the feeder 10. In this disposition of the floor 46, access to any seed in the feed chamber 34 can be achieved only through the windowed walls 30 and 32, and for this purpose, the latter have a plurality of small apertures 64 formed therein. This mode of operation of the feeder accommodates the small niger seeds, and the feeding birds must reach the seeds, these small seeds, through the apertures 64. To open the void 38 to bird-feeding, the floor 46 has to be latched into the lowermost slots 61. With this latter positioning of the floor 46, the floor panels 54 serve as troughs in which the larger seeds can accumulate, and from which birds can feed directly in each mode of operation of the feeder 10, the floor panels 56 act as ramps; they assume diagonal dispositions and, therefore, cause the seed in the feed chamber 34 to move toward the openings 22 and 24, the windowed walls 30 and 32, and to the trough defined by the panels 54.

Figure 5:
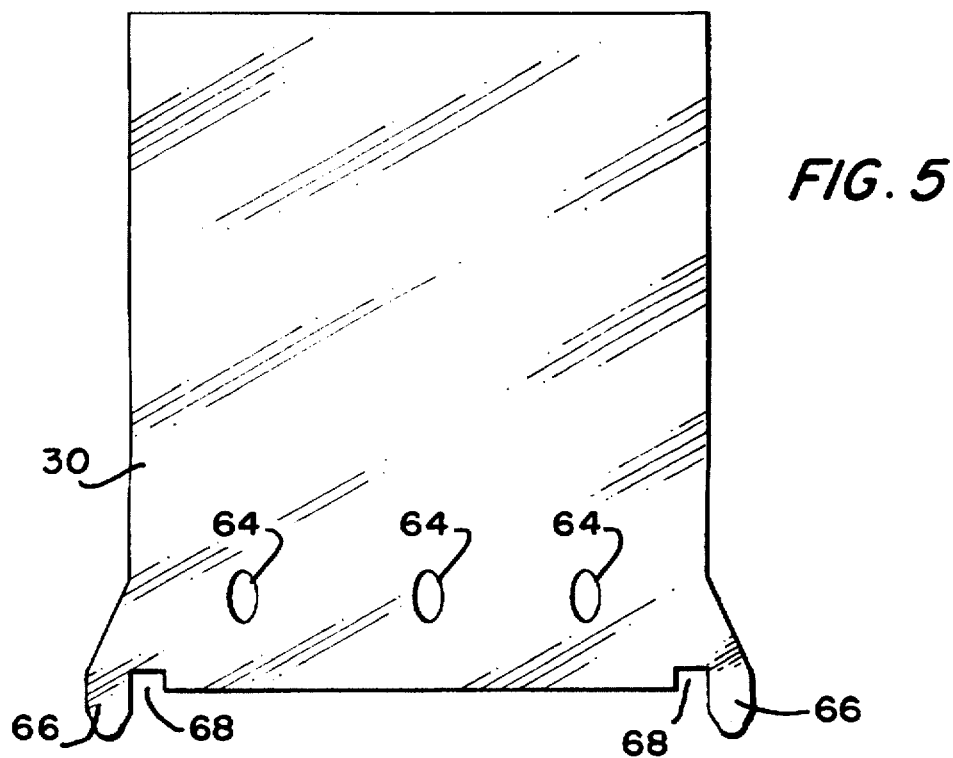
FIG. 5 is a plan view of one of the transparent walls or windows.

The windowed walls 30 and 32 are identical, and one thereof, windowed wall 30 is shown in FIG. 5. There it can be seen that wall 30 is substantially a rectilinear sheet of clear plastic. It has the apertures 64 formed therein, outwardly hung lobes 66, and notches 68. The notches are provided for engaging the sides of the body 12 at the bottom of the slits 26 and 28, whereas the lobes 66 insure that the wall(s) 30 and 32 will not become displaced, at the bottom thereof, in a lateral direction. The ancillary roofs 40 and 42 secure the uppermost ends of the walls 30 and 32 against sidewise displacement.

FIGS. 6 through 9 show features of an alternate floor 70, for use with a feeder having a body 12a with a pair of wider cut-outs 48a. Floor 70 has only the ramp panels 56a and tabs 50a. Body 12a, only the lowermost portion thereof being shown in FIGS. 8 and 9, has slots 58a in which latchingly to receive the first portions 62a of the tabs 50a therein, while the second portions 63a of the tabs 50a extend outwardly from the cut-outs 48a. Contracted and installed in the body 12a, the floor portions 63a project horizontally, in the same plane of the slots 58a and, therefore, serve as perches for the feeding birds.

As can be appreciated, not only does the latching engagement of the floor 46 with the slots 58 or the slots 61 facilitate the two modes of operation or use of the feeder 10, self-evidently, the floor can be readily unlatched from the body, at any time, to enable a simple cleansing. Similarly, floor 70 too is simply unlatched from the slots 58a to open the bottom of the body 12a for cleaning.

While I have described my invention in connection with embodiments thereof, it is to be clearly understood that this is done only by way of example, and not as a limitation to the scope of the invention as set forth in the objects thereof and in the appended claims.

I claim:

1. A bird feeder, comprising:

a body; wherein said body has wall means therein cooperative with said body for forming a feed chamber within said body; and floor means for forming a bottom of said feed chamber; wherein said floor means is only latchingly engaged with said body, and unlatchingly removable from said body;

said body has openings formed therein on opposite sides thereof;

said wall means comprises walls generally paralleling, and recessed from, said openings;

said walls have lowermost terminations;

lowermost portions of said openings are cooperative with said terminations for forming voids for providing external access into said body and said feed chamber;

said body further has (a) an open base, and (b) cut-outs formed on opposite sides thereof at said base;

said body also has first slots, communicating with said cut-outs and extending laterally from sides of said cut-outs, in a given horizontal plane;

said body additionally has second slots, communicating with said cut-outs and extending laterally from sides of said cut-outs, in a differing horizontal plane;

said floor means comprises a sheet of flexible material having oppositely-extending tabs; and in a first mode of operation, first portions of said tabs are engaged with said slots in said given horizontal plane, and second portions of said tabs project outwardly from said cut-outs; and in a second mode of operation, first portions of said tabs are engaged with said slots in said differing horizontal plane, and second portions of said tabs project outwardly from said cut-outs.

2. A bird feeder, according to claim 1, wherein:

said sheet of material has panels which close off said voids, in said first mode of operation with said first portions of said tabs engaged with said slots in said given horizontal plane; and said panels cooperate with said walls to form a feeding trough, in said second mode of operation with said first portions of said tabs engaged with said slots in said differing horizontal plane.

3. A bird feeder, comprising:

a body; wherein said body has wall means therein cooperative with said body for forming a feed-chamber within said body; and floor means for forming a bottom of said feed chamber; wherein said floor means is only latchingly engaged with said body, and unlatchingly removable from said body; wherein said body further has (a) an open base, and (b) cut-outs formed on opposite sides thereof at said base;

said body also has slots communicating with said cut-outs and extending laterally from sides of said cut-outs, in a given horizontal plane;

said floor means comprises a sheet of flexible material having oppositely-extending tabs; and first portions of said tabs are engaged with said slots, and second portions of said tabs project outwardly from said cut-outs.

4. A bird feeder, according to claim 3, wherein:

said body has opening formed therein on opposite sides thereof; and said walls have lowermost terminations;

lowermost portions of said opening are cooperative with said terminations for forming voids for providing external access into said body and said feed chamber; and said sheet of material has panels which close off said voids.

5. A bird feeder, according to claim 3, wherein:

said sheet of flexible material has panels which comprise ramps for directing feed from said chamber outwardly to opposite sides of said body; and said body has openings formed therein on said opposite sides thereof for providing external access into said body and said feed chamber.

6. A bird feeder, according to claim 3, wherein said second portions of said tabs project outwardly from said cut-outs, as aforesaid, in said horizontal plane, to define perches for feeding birds.

7. A bird feeder, according to claim 3, further including:

means coupled to said body for shielding said openings from precipitation.

8. A bird feeder, according to claim 3, wherein:

said body has openings formed therein on opposite sides thereof; and said wall means comprises walls generally paralleling, and recessed from, said openings.

9. A bird feeder, according to claim 8, wherein:

said walls have lowermost terminations; and lowermost portions of said openings are cooperative with said terminations for forming voids for providing external access into said body and said feed chamber.

10. A bird feeder, according to claim 8, wherein:

said walls have a plurality of apertures formed therein.

11. A bird feeder, according to claim 8, wherein:

said walls are transparent.

* * * * *